(12) United States Patent
Gragert

(10) Patent No.: US 12,742,686 B2
(45) Date of Patent: Sep. 22, 2026

(54) OPTICALLY OPERATING TEMPERATURE SENSOR, USE OF SAID TEMPERATURE SENSOR AND BATTERY CELL ASSEMBLY COMPRISING AT LEAST ONE TEMPERATURE SENSOR

(71) Applicant: Kistler Holding AG, Winterthur (CH)

(72) Inventor: Marian Gragert, Sulz (DE)

(73) Assignee: Kistler Holding AG, Winterthur (CH)

( * ) Notice: Subject to any disclaimer, the term of this patent is extended or adjusted under 35 U.S.C. 154(b) by 485 days.

(21) Appl. No.: 18/315,583

(22) Filed: May 11, 2023

(65) Prior Publication Data

US 2023/0366742 A1 Nov. 16, 2023

(30) Foreign Application Priority Data

May 13, 2022 (EP) .................................... 22173174

(51) Int. Cl.
*G01K 1/08* (2021.01)
*G01K 1/14* (2021.01)
*G01K 11/32* (2021.01)

(52) U.S. Cl.
CPC ................ *G01K 1/08* (2013.01); *G01K 1/14* (2013.01); *G01K 11/32* (2013.01)

(58) Field of Classification Search
CPC . G01K 1/08; G01K 1/14; G01K 11/32; G01K 1/026; G01K 1/143; G01K 11/3206; Y02E 60/10; H01M 10/486; G01R 31/3646; G01R 31/389; G01R 31/392
USPC .......................................................... 374/208
See application file for complete search history.

(56) References Cited

U.S. PATENT DOCUMENTS 6,115,122 A * 9/2000 Bao ........................... G01J 3/26 356/480
10,258,240 B1 * 4/2019 Eberle .................. A61B 5/0084
2012/0039358 A1 * 2/2012 Bosselmann ......... E21B 47/135 374/161
2016/0018319 A1 * 1/2016 Hegyi ................ G01D 5/35316 356/73.1
2021/0003392 A1 * 1/2021 Kissinger ............... G01B 11/18

FOREIGN PATENT DOCUMENTS

CN 110838604 B * 10/2020 ............ H01M 10/48
DE 698 30 254 T2 2/2006
DE 102018106710 A1 * 9/2019 ......... G01K 11/3206
EP 3636140 A1 * 4/2020 ............. A61B 5/684
JP S572431 U 1/1982

(Continued)

OTHER PUBLICATIONS

Extended European Search Report English translation for EP application No. 22173174.8, 5 pages.
JP Office Action with Translation, Aug. 13, 2024, 8 pages.

*Primary Examiner* — Kristina M Deherrera
*Assistant Examiner* — Evan Mancini
(74) *Attorney, Agent, or Firm* — Dority & Manning, P.A.

(57) ABSTRACT

An optically operating temperature sensor includes at least one optical fiber configured and disposed for guiding light rays and including a plurality of optical elements configured and disposed for influencing the light rays which can be introduced into the at least one optical fiber, wherein the optical elements and the at least one optical fiber between the optical elements form an assembly together with a protective element.

18 Claims, 2 Drawing Sheets

(56) References Cited

FOREIGN PATENT DOCUMENTS

Figure 1:
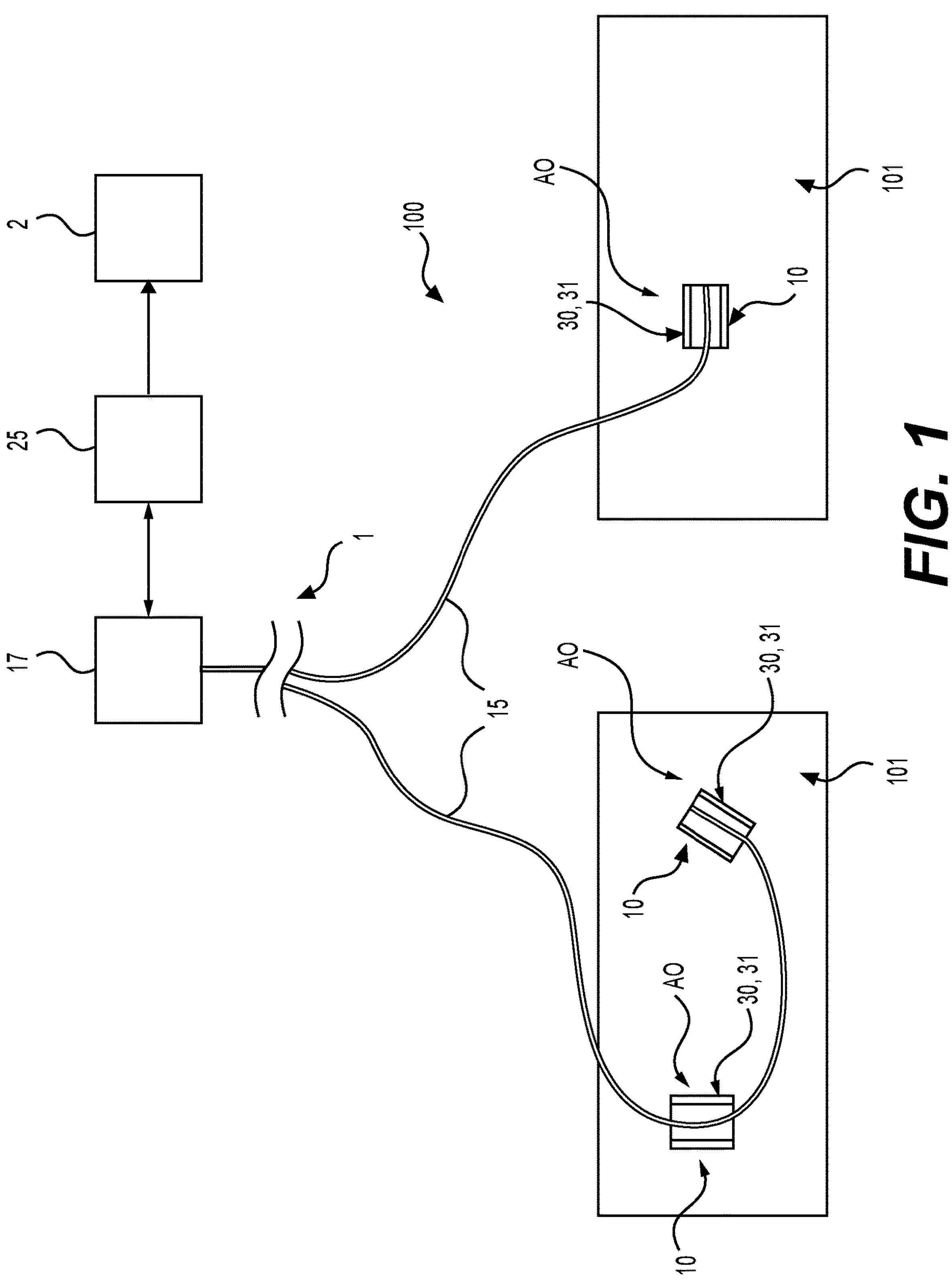

| | | | | |
|---|---|---|---|---|
| JP | H06174561 A | | 6/1994 | |
| JP | 2003344183 | | 12/2003 | |
| JP | 2009 281789 A | | 12/2009 | |
| JP | 2012021939 A | | 2/2012 | |
| JP | 2016198786 A | | 12/2016 | |
| JP | 2021148502 A | * | 9/2021 | |
| JP | 2021188895 A | | 12/2021 | |
| JP | 2022052827 A | | 4/2022 | |
| WO | WO 2011/120829 A2 | | 10/2011 | |
| WO | WO 2019/166765 A1 | | 9/2019 | |
| WO | WO-2021209961 A1 | * | 10/2021 | ............ G01K 11/32 |

* cited by examiner

OPTICALLY OPERATING TEMPERATURE SENSOR, USE OF SAID TEMPERATURE SENSOR AND BATTERY CELL ASSEMBLY COMPRISING AT LEAST ONE TEMPERATURE SENSOR

TECHNICAL FIELD

The invention relates to an optically operating temperature sensor as it is in particular used for detecting a surface temperature at a battery cell of an electric vehicle.

BACKGROUND OF THE INVENTION

A sensor assembly that uses a plurality of optical fibers is known from WO 2019/166765 A1, which corresponds to US Patent Application Publication No. 2021-0003392 that is hereby incorporated herein in its entirety for all purposes and discloses optical fibers that comprise optical elements in the form of reflectors arranged at an axial distance from one another. The sensor assembly disclosed in the known document is for detecting a geometric deformation of the optical fibers. As is known per se, such deformations on the one hand occur when the optical fibers are deformed or distorted by external forces. In addition, such deformations may also occur when the optical fibers change their lengths due to a change in temperature on the basis of their coefficient of thermal expansion. Ways of differentiating between these types of deformations that arise due to different causes are not disclosed in the above-mentioned document.

OBJECTS AND SUMMARY OF THE INVENTION

It is an object of the optically operating temperature sensor according to the present invention to detect only those deformations or distortions of optical fibers that are caused by a change in temperature of the optical fibers. In this way, it is particularly possible to exclude false measurements based on deformations that arise due to an impact of external forces onto the fiber optic elements or optical fibers, respectively. Furthermore, the temperature sensor according to the present invention is also useful for measuring the temperature in electrically conductive or voltage carrying components where the temperature sensor exhibits high accuracy and short response times.

It is disadvantageous particularly in the case of voltage carrying components to use metallic or electrically conductive elements since they increase the risk of short circuits. This disadvantage is inherent to electrical temperature sensors, for example resistance thermometers and all temperature sensors connected with electrical conductors. However, the one according to the present invention is free of this shortcoming.

The idea underlying the present invention is to arrange the optical fibers in functional connection with a protective element in such a way that external forces are absorbed by the protective element and are not introduced into the optical fibers where they cause deformations. In other words, the quintessence of the invention is to keep external forces away from the optical fibers so that a change in the geometry of the optical fibers between the optical elements solely occurs due to a change in temperature, i.e. due to the thermal expansion behavior of the optical fibers.

In accordance with an embodiment of the present invention, an optically operating temperature sensor comprises at least one optical fiber for guiding light rays as well as a plurality of optical elements that are axially spaced apart from one another in the at least one optical fiber for influencing the light rays that can be introduced into the optical fibers. The optical elements and the at least one optical fiber between the optical elements form an assembly together with a rigid protective element that can be connected to a measurement object. The protective element is electrically insulated at least on a side thereof that faces a surface of the measurement object, which side can be connected to the measurement object.

Rigid is intended to refer to a protective element which requires a force for achieving a bending deformation up to a certain bending radius that is at least 10 times higher than that of a bending deformation up to the same bending radius for the optical fiber. It should be understood that an even higher rigidity may be advantageous depending on the forces expected to act in a particular application.

The reflectors or changes in material in the optical fiber for changing the optical properties are the measurement sites that generate signals. It is the quintessence of the invention to protect these measurement sites by an electrically insulating protective element that protects the measurement site from undesired environmental conditions.

Further advantageous embodiments of the temperature sensor according to the invention are set forth in more detail herein.

Advantageously, the protective element consists of a material having a thermal conductivity of at least 0.1 Watt per Meter and degree Kelvin.

Advantageously, the protective element has a coefficient of thermal expansion that is comparable to that of the optical fiber itself. A comparable coefficient of thermal expansion is intended to mean that the coefficients of thermal expansion differ from each other by not more than 20%. In case of greater differences, the protective element will have a mechanical impact onto the optical fiber with a change in the temperature to be determined so that due to the differences in the coefficients of thermal expansion it will be difficult to accurately determine the temperature.

The protective element can be material-bonded to the fiber whereafter it is to be regarded as an assembly. This ensures decoupling from mechanical and chemical influences outside of this assembly.

In a presently preferred constructional embodiment of the protective element, it is preferably configured in the shape of a tube. In other words, this means that due to its geometry the protective element completely surrounds the cross-section of the at least one optical fiber. This reliably prevents impacts of external forces onto the optical fiber(s) where such impacts may cause deformations.

Particularly preferably, the protective element is configured in the shape of a straight tube.

There are various options as to the material of the protective element. For example, the material may be a ceramic or a glass material or a plastic, for example polyether ether ketone (PEEK) or polytetrafluoroethylene (PTFE), polyethylene terephthalate (PET), synthetic resin, epoxy resin (EP). Typically, all of the aforementioned materials have the property of being electrically insulating and therefore do not require any additional coating or the like for rendering the protective element electrically insulating on the side thereof that faces the measurement object. It should be understood that in addition to the appropriate material the protective element must also have an appropriate geometry or material thickness to prevent, on the one hand, deformations of the protective element and to ensure, on the other hand, an as good or unhindered heat transfer as possible from the measurement object into the optical fibers.

The temperature range for use preferably is between −35° C. and 700° C. The peak temperatures of 700° C. occur, for example, in the thermal runaway or thermal propagation assessment. In this case, the protective element will be made of a thermally resistant material. In a further application for battery testing, the temperature range is between −35° C. and 200° C.

Furthermore, it is particularly preferred to directly connect the at least one optical fiber and the protective element with each other. This may be done by using glass or glass solder (initially molten) as the material for the protective element, for example.

Alternatively, the at least one optical fiber and the protective element may also be bonded to each other using a thermally conductive adhesive. This improves heat transfer between the protective element and the at least one optical fiber.

Particularly in the case where glass material is used for the protective element, it is provided that the chemical composition of the glass material is identical to that of the at least one optical fiber. In this manner, it will be easier to match the assembly with regard to keeping the coefficients of thermal expansion of the optical fiber and the glass material or the protective element, respectively, as similar as possible. Furthermore, when using glass solder for the protective element, for example, the material of the protective element may also be useful for forming a material bond with the measurement object without need of additional auxiliary agents. This material bond for improving thermal conductivity may also be achieved by using a thermally conductive adhesive.

Moreover, there are also various options as to the technology on which the temperature detection is based. In particular, the temperature sensor according to the invention has the advantage that it enables to measure the temperature on the basis of different technologies depending on the application without requiring specific adaptations, in particular to the protective element. Thus, in a first embodiment, it is provided that the temperature sensor is configured to enable temperature detection on the basis of the FSI (Fiber Segment Interferometry) technology. Such a technology is described in WO 2019/166765 A1 that corresponds to US Patent Application Publication No. 2021-0003392 that is hereby incorporated herein in its entirety for all purposes.

Alternatively, the temperature sensor may also be configured to enable temperature detection on the basis of a FBG (Fiber Bragg Gratings) technology as is known per se.

As already explained above, the temperature sensor according to the invention finds use in particular for detecting a surface temperature of a battery cell, in particular a battery cell of an electric vehicle.

Eventually, the invention also encompasses a battery cell assembly of an electric vehicle comprising a plurality of battery cells and at least one, preferably a plurality of, temperature sensors configured according to the invention wherein the at least one temperature sensor is connected to the surface of a battery cell in a thermally conducting manner.

Further advantages, features and details of the invention will be apparent from the following description of preferred embodiments of the invention and the drawings.

BRIEF DESCRIPTION OF THE SEVERAL VIEWS OF EXEMPLARY DRAWINGS

Figure 2:
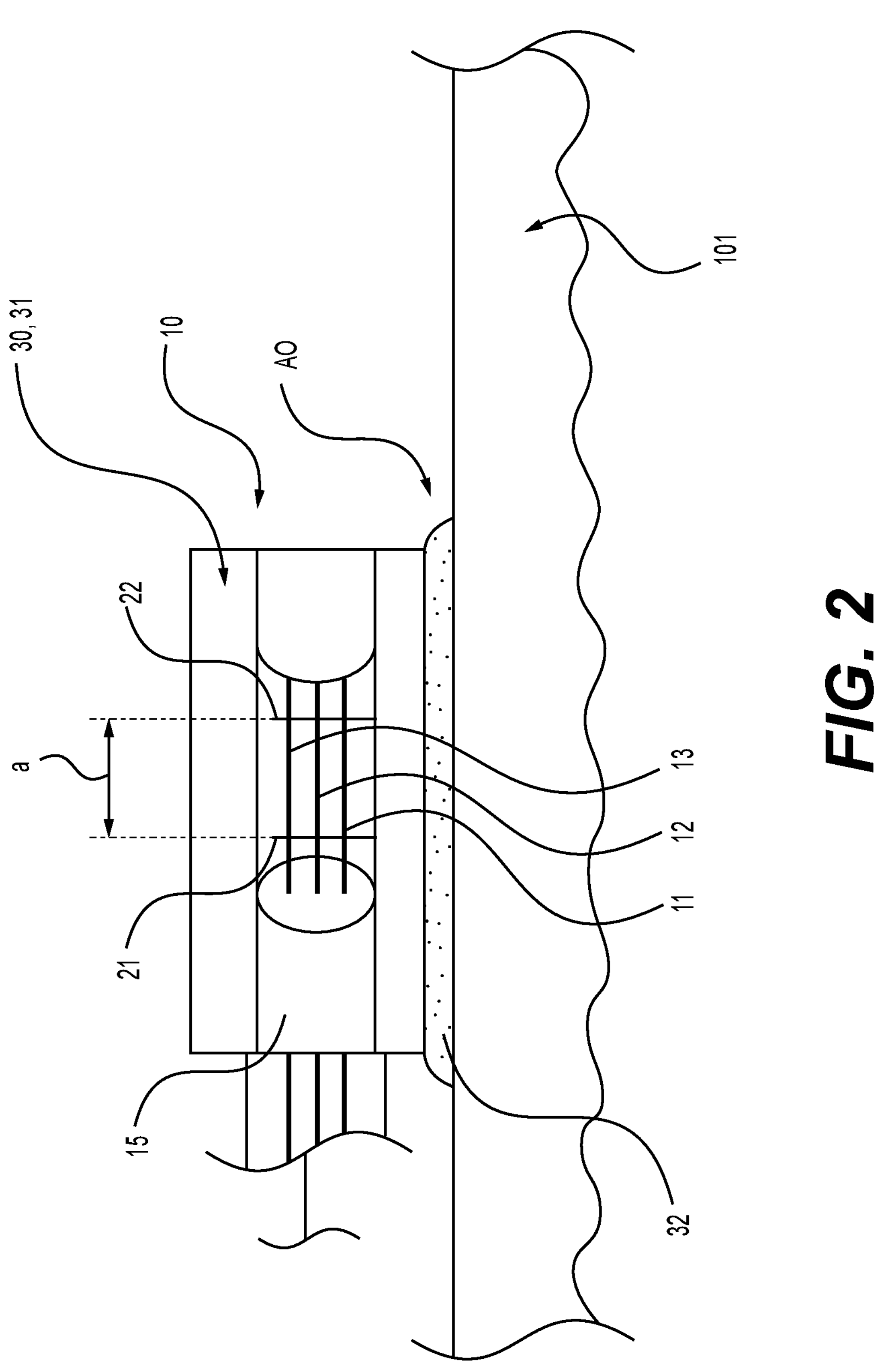

In the following, the invention is explained in more detail by way of example with reference to the figures in which:

FIG. 1 shows a simplified representation of an assembly consisting of a plurality of battery cells for an electric vehicle having optically operating temperature sensors arranged or attached thereto, and FIG. 2 shows a schematic representation of an optically operating temperature sensor according to FIG. 1.

DETAILED DESCRIPTION OF EXEMPLARY EMBODIMENTS OF THE INVENTION

Throughout the figures, identical elements or elements performing the same function are denoted with the same reference numerals.

FIG. 1 provides a greatly simplified representation of a battery cell assembly 100 as it is used in particular as a component of an electric vehicle for powering the electric vehicle. The battery cell assembly 100 comprises a plurality of battery cells 101 that are typically shaped like flat (pouch) or cuboidal (prismatic) or circular (round) lithium-ion battery cells and electrically connected with one another in series or in parallel (not shown) wherein, for reasons of simplicity, the representation in FIG. 1 shows only two battery cells 101. It is essential in the operation of such a battery cell assembly 100 that the individual battery cells 101 operate within a specific temperature window to develop, on the one hand, their full operational performance and to prevent, on the other hand, any damage or initial damage due to excessively high or low temperatures. For this purpose, it is known per se from the prior art to maintain the battery cell assembly 100 within the desired temperature window by means of a heating device or a cooling device (thermal management system).

In order to detect the temperature of the battery cells 101 with regard to the desired temperature, at least one of the battery cells 101, or both battery cells 101 as shown in this example, is equipped with a sensor device 1 for detecting a surface temperature of a battery cell 101. The sensor device 1 detects the temperature Tat the at least one battery cell 101 that constitutes the measurement object and forwards the detected data for example to a control device 2 that controls the driving power of the electric vehicle for example at least indirectly or else activates the heating or cooling device mentioned above in order to keep the temperature T of the battery cells 101 within the desired temperature window. For a series application, vehicle manufacturers rely on a few battery cells equipped with measurement sites. In development applications, detection from a large number of measurement sites is important for the design, simulation and testing of the prototypes which means that conventional temperature measurement technology owing to its electrically conductive cables reaches its limits. Fiber-optic measurement technology is viewed critically since effects due to mechanical forces may occur and these effects due to mechanical forces may falsify the measurement result. This is the problem the invention seeks to solve by providing fiber-optic measurement technology that is suitable for measuring temperatures at current carrying or voltage carrying components. Preferably, the fiber-optic measurement technology includes a large number of measurement sites per optical fiber 15 and a detection unit 25 for multiple optical fibers 15. The accuracy of the temperature values to be achieved is achieved by the assembly comprising a protective element described herein.

By way of example, the sensor device 1 schematically depicted in FIG. 1 comprises a plurality of temperature sensors 10 designed in accordance with the present invention. In the example shown, one battery cell 101 has two temperature sensors 10 arranged on the surface thereof while the other battery cell 101 has (only) one temperature sensor 10 arranged thereon. It should be understood that it is also within the scope of the invention to arrange more than two temperature sensors 10 at a battery cell 101. With regard to the arrangement of a temperature sensor 10, it is essential or desirable that the mounting location(s) AO are selected in such a way that a temperature T that is characteristic for the battery cell 101 is detected. Thus, for example, a desirable mounting location AO might be situated at a site where the highest or the lowest or an average temperature T occurs at the battery cell. In general, this selection of mounting sites AO facilitates the ability to draw conclusions with respect to the current density in the battery cell at the measurement site AO or with respect to cooling.

The optically operating temperature sensors 10 are of identical construction, each sensor 10 comprising, by way of example, three optical fibers 11 to 13 in the form of three waveguides that desirably are combined or bundled within a common optical fiber strand 15. Referring to the schematic representation of FIG. 1, the temperature sensors 10 are coupled to a device 17, represented only figuratively, for generating light, in particular laser beams. Desirably, the light generating device 17 is configured for coupling the light rays into the optical fibers 11 to 13. Furthermore, each of the individual optical fibers 11 to 13 may optionally be provided with a protective sheathing, not shown for the sake of simplifying the drawing, that prevents light carried in one fiber from infiltrating one of the other fibers.

The portion of the optical fiber strand 15 that corresponds to the mounting location AO of the respective temperature sensor 10 on the battery cell 101 further comprises at least two optical elements 21, 22, which are arranged at an axial distance "a" from each other. As schematically shown in FIG. 2 for example, each of the three optical fibers 11, 12, 13 desirably elongates in a straight line along a longitudinal direction between the optical elements 21, 22. The optical elements 21, 22 are for example configured in the form of reflectors or optical gratings such that a change in the distance "a" directly results in a change in the optical properties of the light coupled into the optical fiber strands 11 to 13, which optical properties of the light are detectable by means of an evaluation device 25.

In particular, the temperature sensor 10 uses a measurement principle that is based on an FSI technology or, alternatively, on an FBG technology. With regard to the FSI technology, reference is made by way of example to WO 2019/166765 A1 which explains the physical principle and which in this respect is hereby incorporated by reference in this application.

To detect a change of the distance "a" that is caused solely by a change in the temperature of a battery cell 101 and not by an external force leading to a deformation of the temperature sensor 10 at the mounting location AO, it is provided according to the invention that the temperature sensor 10 is surrounded by a rigid protective element 30 at the mounting location AO. In this respect, the optical fibers 11 to 13 together with the optical elements 21, 22 and the protective element 30 form an assembly 31 that is at least thermally connected to the surface of the battery cell 101.

By way of example, the protective element 30 is tubular or shaped like a tube and for example made of a ceramic or a glass material such as glass solder or a plastic such as polyether ether ketone (PEEK), polytetrafluoroethylene (PTFE), polyethylene terephthalate (PET), synthetic resin, epoxy resin (EP).

In order to prevent coupling of electrical voltages or currents into the temperature sensor 10 or into the battery cell 101, the material of the protective element 30 exhibits electrically insulating or poor electrical conductivity properties as do the exemplary materials already mentioned above. Alternatively or additionally, the protective element 30 may be provided with an electrically insulating coating at least on the surface contacting the battery cell 101 (not shown).

Depending on the material used, it is also possible to achieve the rigidity of the protective element 30 by appropriately dimensioning the wall thickness or the like of the protective element 30.

The rigidity of the protective element may be adapted in accordance with the external forces expected. For example, the dimensioning of the wall thickness may be selected accordingly for a given material of the protective element 30.

Preferably, the protective element 30 exhibits good thermal conductivity so that the current temperature T at the battery cell 101 is quickly introduced into the protective element 30 and transferred to the optical fibers 11 to 13. To this end, it is provided that the material of the protective element 30 consists of a material having a thermal conductivity of at least 0.1 Watts per Meter and degree Kelvin (W/(m·K)).

Preferably, the protective element 30 is configured to be elongated along a straight line, but it may also have a curvature, for example. Moreover, as shown in the example depicted in FIG. 2, the optical fiber strand 15 is arranged radially in a direct closely fitting contact with the protective element 30. Such direct close fitting or such direct closely fitting contact can be effected for example by a joining process such as press-fitting or shrink-fitting. Alternatively, it may also be provided that the optical fiber strand 15 is bonded to the protective element 30 by a thermally conductive adhesive or a like medium.

However, it is not absolutely required to dispose the protective element 30 in direct closely fitting contact with the optical fiber 11 to 13. It has been shown that an air gap between the optical fiber 11 to 13 and the protective element 30 also enables the temperature in a battery cell to be measured accurately. In the latter case, the protective element 30 is spaced apart radially from the optical element 21, 22 by the air gap shown in FIG. 2. The protective element 30 can be connected on both sides to the optical fiber 11 to 13 in a region where no optical element 21, 22 is arranged (not shown). An air gap may also be filled with a gas. In contrast, a vacuumized gap is not useful.

Furthermore, it is advantageous to ensure that there is good heat transfer from the surface of the battery cell 101 to the protective element 30. In the example shown in FIG. 2, a thermally conductive adhesive 32 is provided for this purpose. The disposition of the thermally conductive adhesive 32 shown in FIG. 2 not only ensures good heat transfer but also ensures secure attachment of the protective element 30 to the surface of the battery cell 101 in a known manner.

In the case where the protective element 30 is made of a glass material, it is preferably provided that the chemical composition of the glass material is identical to that of the material of the optical fibers 11 to 13 or the optical fiber strand 15. Furthermore, in this case the material used for the protective element 30 can also be used for providing the connection to the battery cell 101, in particular where glass solder is used.

The temperature sensor 10 described thus far may be altered or modified in a variety of ways without departing from the spirit of the invention. Thus, it may be provided that the cross-section of the protective element 30 is not tubular but instead rectangular, for example, wherein for the optical fibers 11 to 13 this cross-section comprises a groove for receiving the optical fibers 11 to 13 on the side facing away from the battery cell 101, in which groove the optical fibers 11 to 13 are embedded and fixed. In this case, the planar side of the cross-section of the protective element 30 that faces the battery cell 101 additionally provides particularly good heat transfer or a large area of contact.

LIST OF REFERENCE NUMERALS

1 sensor device
2 control device
10 temperature sensor
11 optical fiber
12 optical fiber
13 optical fiber
15 optical fiber strand
17 device
21 element
22 element
25 evaluation device
30 protective element
31 assembly
32 thermally conductive adhesive
100 battery cell assembly
101 battery cell
a distance
AO mounting location

What is claimed is:

1. An optically operating temperature sensor configured for attachment to a measurement object, the optically operating temperature sensor comprising:

an optical fiber strand configured to elongate along a longitudinal axis and defined by an external surface extending along the longitudinal axis, wherein the optical fiber strand includes at least one optical fiber disposed within the optical fiber strand and spaced apart from the external surface;

wherein the at least one optical fiber is configured to extend along the longitudinal axis between a first end and a second end spaced apart from the first end along the longitudinal axis and disposed for guiding light rays along the longitudinal axis;

at least a first optical element arranged axially spaced apart from at least a second optical element along the at least one optical fiber, wherein the first optical element and the second optical element are disposed between the first and second ends of the at least one optical fiber, and wherein each of the first and second optical elements is configured and disposed for influencing the light rays which can be introduced into the at least one optical fiber;

wherein the first optical element is a first optical grating, the second optical element is a second optical grating, and each of the first and second optical gratings is configured and disposed to employ FSI technology during temperature detection; and a rigid protective element disposed in continuous contact with the optical fiber strand's external surface along the longitudinal axis between the at least first and second optical elements of the at least one optical fiber, wherein said protective element is electrically insulated at least on a side thereof that is configured to face a surface of the measurement object and that can be connected with the measurement object, wherein the coefficient of thermal expansion of the rigid protective element and the coefficient of thermal expansion of the at least one optical fiber differ from each other by not more than 20% of the coefficient of thermal expansion of the at least one optical fiber.

2. The temperature sensor according to claim 1, wherein the protective element consists of a material having a thermal conductivity of at least 0.1 W/(m·K).

3. The temperature sensor according to claim 2, wherein the protective element is configured in the shape of a tube.

4. The temperature sensor according to claim 3, wherein the protective element is configured as a straight tube.

5. The temperature sensor according to claim 1, wherein the protective element is configured in the shape of a tube.

6. The temperature sensor according to claim 5, wherein the protective element is configured as a straight tube.

7. The temperature sensor according to claim 1, wherein the material of the protective element consists of a ceramic.

8. The temperature sensor according to claim 1, wherein the optical fiber strand and the protective element are directly connected to each other.

9. The temperature sensor according to claim 1, further comprising a thermally conductive adhesive that connects the at least one optical fiber to the protective element between the spaced apart optical elements and to the optical elements.

10. The temperature sensor according to claim 9, wherein the optical fiber strand and the protective element are thermally coupled to each other by means of the thermally conductive adhesive.

11. The temperature sensor according to claim 1, wherein an air gap exists between the at least one optical fiber and the protective element in the region between the optical elements.

12. The temperature sensor according to claim 1, wherein the protective element is formed of glass material that has a chemical composition identical to that of the at least one optical fiber.

13. The temperature sensor according to claim 1, wherein the material of the protective element consists of a glass material.

14. The temperature sensor according to claim 1, wherein the material of the protective element consists of a plastic material.

15. The temperature sensor according to claim 1, wherein the material of the protective element consists of a synthetic resin.

16. The temperature sensor according to claim 1, wherein the material of the protective element consists of an epoxy resin.

17. The temperature sensor according to claim 1, wherein the material of the protective element consists of a polyether ether ketone.

18. A battery cell assembly of an electric vehicle, the battery assembly comprising:

a plurality of battery cells including a first battery cell defining a surface thereof;

a temperature sensor connected to the surface of the first battery cell in a thermally conductive manner, wherein the temperature sensor includes:

an optical fiber strand configured to elongate along a longitudinal axis and defined by an external surface extending along the longitudinal axis, wherein the optical fiber strand includes at least one optical fiber disposed within the optical fiber strand and spaced apart from the external surface;

at least one optical fiber configured to extend along the longitudinal axis between a first end and a second end spaced apart from the first end along the longitudinal axis and disposed for guiding light rays along the longitudinal axis;

at least a first optical element arranged axially spaced apart from at least a second optical element along the at least one optical fiber, wherein the first optical element and the second optical element are disposed between the first and second ends of the at least one optical fiber, and wherein each of the first and second optical elements is configured and disposed for influencing the light rays which can be introduced into the at least one optical fiber;

wherein the first optical element is a first optical grating, the second optical element is a second optical grating, and each of the first and second optical gratings is configured and disposed to employ FSI technology during temperature detection; and a rigid protective element disposed in continuous contact with the optical fiber strand's external surface along the longitudinal axis between the at least first and second optical elements of the at least one optical fiber, wherein said rigid protective element is electrically insulated at least on a side thereof that is connected with the surface of the first battery cell, wherein the coefficient of thermal expansion of the rigid protective element and the coefficient of thermal expansion of the at least one optical fiber differ from each other by not more than 20% of the coefficient of thermal expansion of the at least one optical fiber.

* * * * *